Oct. 29, 1963 D. M. ZABRISKIE 3,108,845

ADJUSTABLE STYLUS HOLDER FOR FACSIMILE RECORDING

Filed June 19, 1961 3 Sheets-Sheet 1

INVENTOR.
DOUGLAS M. ZABRISKIE

BY J. B. Burke

ATTORNEY

ADJUSTABLE STYLUS HOLDER FOR FACSIMILE RECORDING

Filed June 19, 1961 3 Sheets-Sheet 2

INVENTOR.
DOUGLAS M. ZABRISKIE
BY J. B. Burke
ATTORNEY

Oct. 29, 1963 D. M. ZABRISKIE 3,108,845

ADJUSTABLE STYLUS HOLDER FOR FACSIMILE RECORDING

Filed June 19, 1961 3 Sheets-Sheet 3

INVENTOR.
DOUGLAS M. ZABRISKIE

BY J. B. Burke

ATTORNEY

United States Patent Office 3,108,845

Patented Oct. 29, 1963

3,108,845

ADJUSTABLE STYLUS HOLDER FOR FACSIMILE RECORDING

Douglas M. Zabriskie, Northvale, N.J., assignor to The Western Union Telegraph Company, New York, N.Y., a corporation of New York Filed June 19, 1961, Ser. No. 117,918
4 Claims. (Cl. 346—139)

This invention concerns an adjustable stylus holder for use in electrical facsimile recorder.

Facsimile recorders have been known heretofore in which a plurality of non-adjustable stylus holders were mounted in spaced positions on a flexible, endless belt, such as described in U.S. Patent 2,770,517. It is the practice for these stylus holders to be secured as precisely as possible in equally spaced positions while in a static condition. It has been discovered that these precise equal spacings change when the belt is in motion during normal operation, due to inherent irregular loadings. As a result repetitive distorted patterns occur in recorded lines. In such non-adjustable type holders, the correction of spacing for dynamic conditions of operation is difficult or impossible to accomplish, so that the entire belt and holders must frequently be discarded.

The present invention is directed at overcoming the above mentioned difficulties by providing a novel adjustable holder for a stylus on a flexible belt, which permits precise positioning of the stylus to be effected after the holder is mounted on the belt, and under dynamic conditions of operation.

A further object is to provide a stylus holder including a dovetail slide movable by a self-locking screw in a block having a dovetail groove.

Another object is to provide adjustable stylus holders which can be observed while in operation on a flexible belt in a facsimile recorder to determine and facilitate proper spacing of the styluses carried by the holders for optimum, undistorted recorder operation.

The invention will be best understood from the following detailed description taken together with the drawing, wherein.

Figures 1, 2:
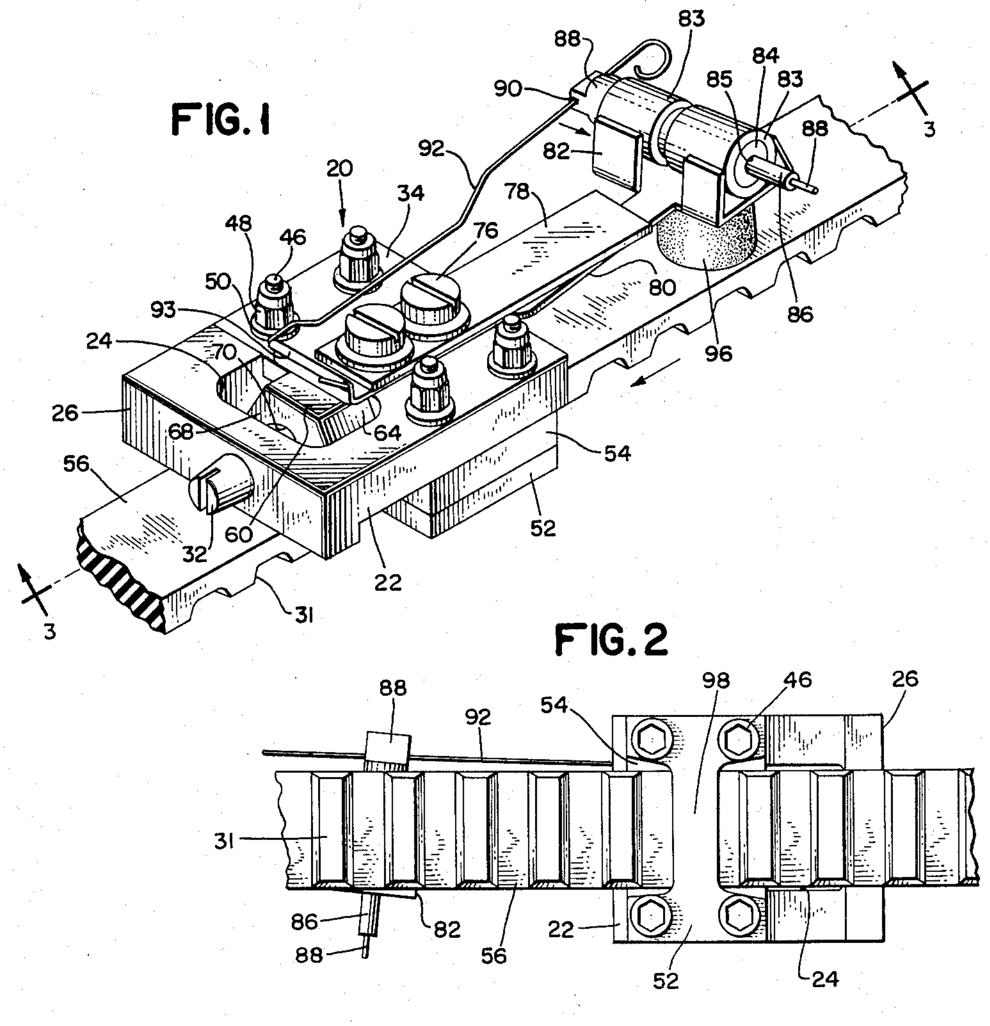
FIG. 1 is a perspective view of a stylus holder embodying the invention shown mounted on a flexible belt.
FIG. 2 is a bottom plan view of the stylus holder and belt assembly.
Figure 5:
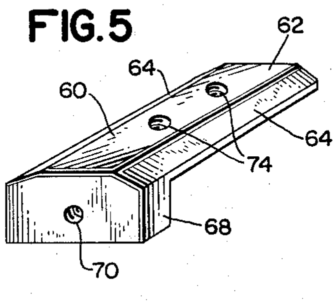
FIG. 5 is a perspective view of a slide member employed in the stylus holder.
Figure 3:
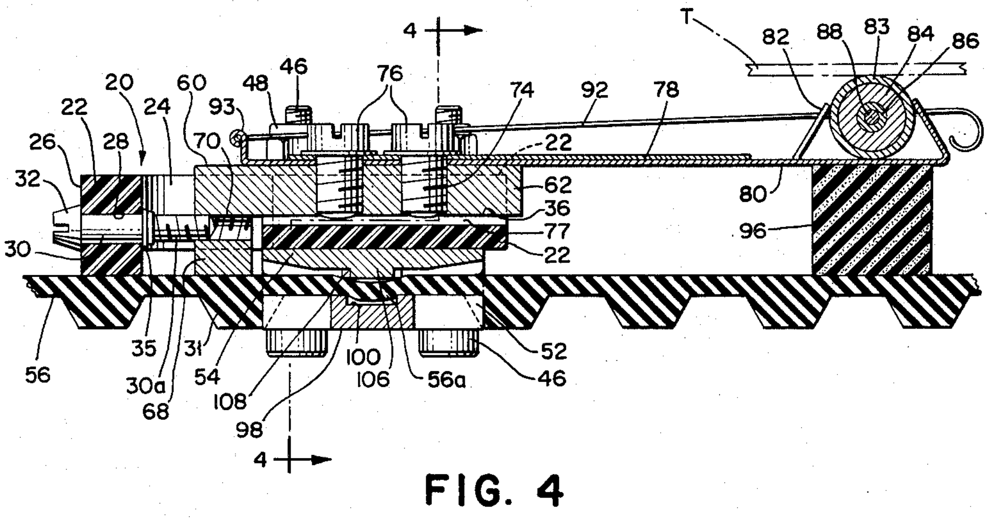
FIG. 3 is a longitudinal sectional view on an enlarged scale taken on line 3—3 of FIG. 1.
Figure 4:
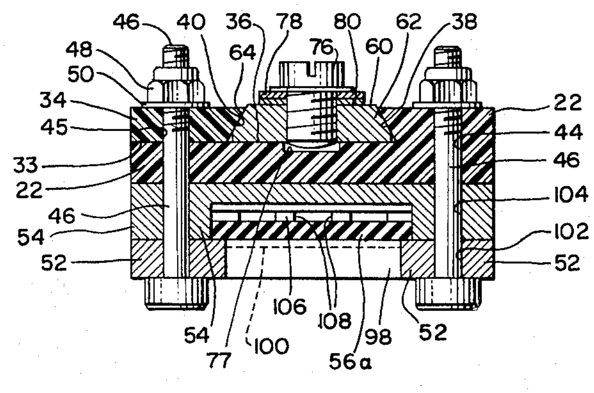
FIG. 4 is a vertical cross sectional view taken on line 4—4 of FIG. 3.
Figure 6:
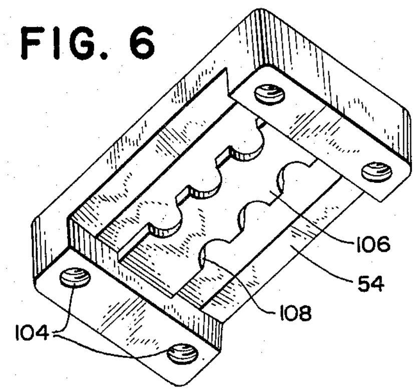
FIG. 6 is an oblique view of a belt clamp plate employed in the stylus holder.

Referring to FIGS. 1–4, there is shown a stylus holder 20 embodying the invention. The holder includes an insulated block 22 preferably made of plastic such as nylon. The block is generally rectangular and is formed with a rectangular hole 24. In the front end 26 of the block is a hole 28 in which is rotatably seated the unthreaded shank portion 30 of an adjustment screw 32 having a locking washer 35. The block is formed with a recess 33 at its upper side in which seats an auxiliary plastic block plate 34. The top of the block extending from hole 24 is formed with a groove 36 having an inclined, undercut side edge 38. Plate 34 has a similar oppositely inclined edge 40 so that a groove is dovetailed. Holes 44, 45 are formed in the block and plate and receive screws 46 which are secured by nuts 48. Washers 50 may be provided under the nuts to bear on the block and block plate. Clamp plates 52 and 54 held by screws 46 serve to secure the block and plate to an endless flexible belt 56.

A slide member 60, best shown in FIGS. 1, 3–5, has a dovetail portion 62 slidably fitted in the dovetail groove 36. Opposite inclined or beveled edges 64 of the slide member interfit with the inclined edges 38 and 40 of the block and plate. The slide member has a depending forward end plate 68 in which is a threaded hole 70 to receive the threaded portion 30*a* of the shank of adjustment screw 32. Two longitudinally spaced holes 74 in the slide member receive screws 76 for securing ends of leaf springs 78, 80 to the slide member. A groove 77 is formed in the bottom of groove 36 to clear ends of screws 76.

Upper spring 78 bears down on lower spring 80. Spring 80 is longer than spring 78 and at its rear end is formed with upwardly extending spring fingers 82 in which is removably disposed a cylindrical bearing member 83. The bearing member has a jeweled core 84 in which is an axial hole 85. A tubular pin 86 having a stylus 88 fixed in one end is slidably disposed in hole 85. The other end of pin 86 is secured in a head 88 having a slot 90. A wire spring 92 has a bent front end secured in an upturned front end 93 of spring 80. The rear end of the spring rests in slot 90 and urges the stylus pin axially and laterally of the longitudinal direction of the belt. A sponge rubber pad 96 is secured to the underside of spring 80 and rests on the upper side of the belt.

Lower clamp plate 52 shown in FIGS. 1–4, has a narrow central web 98 formed with an upper recess 100. The four corners of the plate have unthreaded holes 102 through which pass screws 46. The upper clamp plate 54 shown in FIGS. 1–4 and 6 is generally rectangular with four corner threaded holes 104 which engage the screws 46. A central ridge 106 with notches 108 is formed on the underside of the plate 54. The belt 56 is interposed between the clamp plates 52 and 54. Since the belt is flexible, a lower portion 56*a* of the belt is forced into the rectangular recess 100 of plate 52 while the ridge 106 is forced into the top of the belt. The notched portions serve as coarse teeth and effectively secure the belt in position between the plates 52, 54.

It will be noted that the slide member 60 can be moved axially on the block 22 by turning the adjustment screw 32. This screw adjustment permits precise positioning of the stylus with respect to the stylus holder and belt. The belt is shown provided with teeth 31 which cooperate with sprockets or toothed pulleys in the facsimile recorder. At the location of the stylus holder, a tooth or cog of the belt is omitted at location 56*a* between adjacent teeth 31*a* and 31*b*. If the belt carries three stylus holders, then three equally spaced locations 56*a* will be provided at which teeth are omitted to facilitate mounting of the clamp plates 52, 54 to the belt. When the belt and stylus holders are installed in a facsimile recorder, the styluses are effectively insulated from the belt and clamp plates by the insulated block. Electric currents pass through the stylus via the jeweled bearing 83 which slides under a conductive trolley wire or bar T in the recorder, indicated by dotted lines in FIG. 3.

A method of precisely positioning the styluses on a flexible belt carrying three stylus holders will now be described with reference to FIGS. 7–14, to illustrate the utility of the invention and its manifold advantages of prior known non-adjustable stylus holders.

Figure 7:
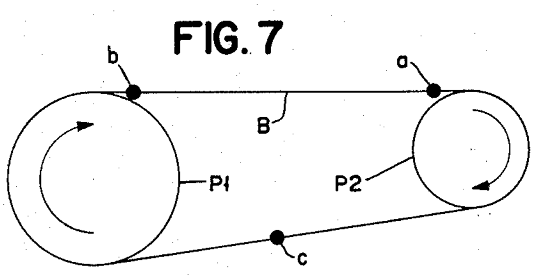
FIGS. 7, 9 and 12 are diagrams of belt and stylus holder assemblies employed in a method of stylus position adjustment.
Figure 8:
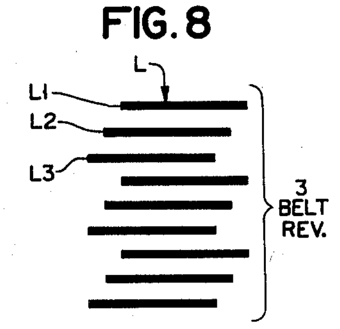
FIGS. 8, 10, 11, 13 and 14 are diagrams of recorded line patterns employed in explaining the method of stylus position adjustment.

To effect adjustment of styluses *a*, *b* and *c* in an asesmbly of three stylus holders on a belt B carried on pulleys P1 and P2, indicated diagrammatically in FIG. 7, the following procedure may be employed:

Several lines of copy will be recorded on a recording sheet. In FIG. 8 are shown nine such lines L i.e. three sets of repeated lines L1, L2 and L3, obtained during three revolutions of belt B. It will be noted that a pattern occurs in which misalignment of the ends of the several lines repeatedly occurs. It is this undesirable condition which can be corrected by the present invention. The pattern of FIG. 8 indicates that stylus *a* which recorded the lines L1 line is leading in position, needing adjustment to the left as shown in FIG. 7 and stylus *c* which recorded lines L3 is lagging needing adjustment to the right. Identification of the several styluses cannot be made conveniently while the belt and stylus holders are in motion. The identification can be made if any one stylus is removed and replaced by a dummy stylus, that is, one which is too short to mark the recording paper.

Figure 9:
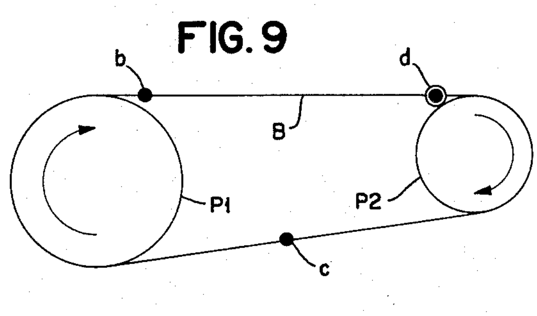
Figure 10:
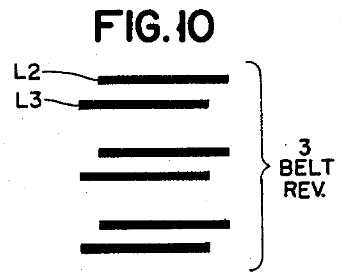
Figure 12:
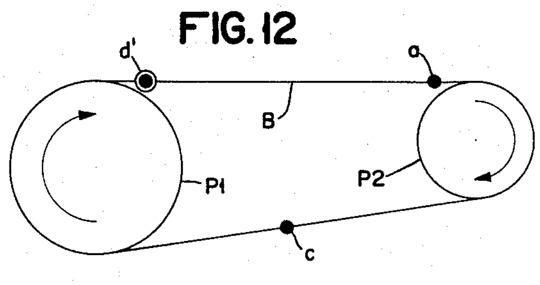

FIG. 9 shows a dummy stylus *d* located at random to replace stylus *a*. Copy is again recorded and the pattern appears as shown in FIG. 10. Lines formerly recorded by stylus *a* are absent, but lines L3 lag lines L2. This suggest that stylus *b* following the dummy stylus *d* needs adjustment to the left or stylus *c* needs adjustment to the right. The adjustment screws 32 are turned clockwise or counterclockwise to effect the adjustments of the styluses. Since one turn of the screw will effect a predetermined length of movement of the slide member 60 and repositioning of the stylus, precise measurement of the recorded pattern will indicate precisely how much each adjustment screw should be turned.

Figure 11:
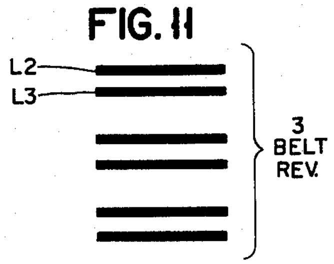
Figure 14:
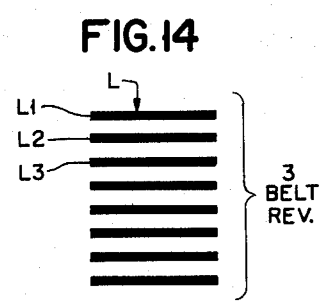
Figure 13:
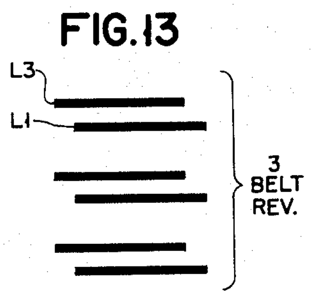

Suppose now after adjustment, the test copy appears as shown in FIG. 11, with all lines L2, L3 in registration. This indicates satisfactory adjustment of styluses *b* and *c*. The stylus *b* is now removed and the dummy stylus is now moved to the former position of stylus *b*, indicated at *d'* in FIG. 12. Stylus *a* is replaced in the position vacated by the dummy stylus *d*. Another sample of recorded copy may be taken and may appear as shown in FIG. 13. It now appears that stylus *a* preceding the dummy stylus *d'* needs adjustment to the left since lines L1 are recorded to the left of lines L3 recorded by stylus *c* which was previously adjusted. The adjustment screw 32 may now be turned to provide the required adjustment of stylus *a*. The dummy stylus *d'* may now be replaced by stylus *b* and a further test copy pattern will now appear as shown in FIG. 14. The alignment of the ends of all lines L1, L2, L3 shows that the proper positioning of the styluses has been precisely accomplished.

The invention facilitates these adjustments being made in the field where the recorders are in use. The invention makes it unnecessary to discard or to return belts and stylus holders to factory or laboratory for rebuilding as has been required heretofore.

I claim:

1. In a facsimile recorder in combination, flexible belt, a stylus holder assembly mounted on said belt in a fixed position thereon, said assembly including a block having a dovetail groove therein extending lengthwise of the belt, a slide member having a dovetail portion slidable in said groove lengthwise of the belt, said member having a threaded aperture in an end thereof, a screw carried by said block and engaged in said aperture whereby said slide member is adjustably positioned in said block lengthwise of the belt, spring means carried by said slide member, stylus carried by said spring means, and clamping members secured to said block and clamping said belt therebetween, whereby the stylus is adjustably positionable in a direction lengthwise of the belt while said assembly remains clamped in said fixed position thereon.

2. In a facsimile recorder in combination, a flexible belt, a stylus holder assembly mounted on said belt in a fixed position thereon, said assembly including a block having a dovetail groove therein extending lengthwise of the belt, a slide member having a dovetail portion slidable in said groove lengthwise of the belt, said member having a threaded aperture in an end thereof, a screw carried by said block and engaged in said aperture, whereby said slide member is adjustably positioned in the block lengthwise of the belt, spring means carried by said slide member, and a stylus carried by said spring means, whereby the stylus is adjustably positionable in a direction lengthwise of the belt while said assembly remains in said fixed position thereon.

3. In a facsimile recorder in combination a flexible belt, a stylus holder assembly mounted on said belt in a fixed position thereon, said assembly including a block having a dovetail groove therein extending lengthwise of the belt, a slide member having a dovetail portion slidable in said groove lengthwise of the belt, said member having a threaded aperture in an end thereof, a screw carried by said block and engaged in said aperture, whereby said slide member is adjustably positioned in the block, spring means carried by said slide member, and a stylus carried by said spring means, whereby the stylus is adjustably positionable in a direction lengthwise of the belt while said assembly remains in said fixed position thereon, said block being formed of insulation material so that the stylus is insulated from the belt, said block including a removable clamping portion having a beveled edge forming part of said groove.

4. In a facsimile recorder in combination, a flexible belt, a stylus holder assembly mounted on said belt in a fixed position thereon, said assembly including a block having a dovetail groove therein extending lengthwise of the belt, a slide member having a dovetail portion slidable in said groove lengthwise of the belt, said member having a threaded aperture in an end thereof, a screw carried by said block and engaged in said aperture whereby said slide member is adjustably positioned in said block, spring means carried by said slide member, a stylus carried by said spring means, and clamping members secured by said block and clamping said belt therebetween, whereby the stylus is adjustably positionable in a direction lengthwise of the belt while said assembly remains clamped in said fixed position thereon, said block being formed of insulation material so that the stylus is insulated from the belt, said block including a removable clamping portion formed of insulation material and having a beveled edge forming part of said groove.

References Cited in the file of this patent

UNITED STATES PATENTS

| | | |
|---|---|---|
| 1,460,901 | Hart | July 3, 1923 |
| 2,212,970 | Finch | Aug. 27, 1940 |
| 2,278,919 | Erickson et al. | Apr. 7, 1942 |
| 2,850,350 | Wise et al. | Sept. 2, 1958 |